United States Patent
Kato et al.

(10) Patent No.: US 9,587,720 B2
(45) Date of Patent: Mar. 7, 2017

(54) CHAIN TENSIONER AND CHAIN TRANSMISSION DEVICE

(71) Applicants: Akio Kato, Shizuoka (JP); Shinji Oishi, Shizuoka (JP)

(72) Inventors: Akio Kato, Shizuoka (JP); Shinji Oishi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 207 days.

(21) Appl. No.: 14/370,807

(22) PCT Filed: Dec. 27, 2012

(86) PCT No.: PCT/JP2012/083834
§ 371 (c)(1),
(2) Date: Jul. 7, 2014

(87) PCT Pub. No.: WO2013/105448
PCT Pub. Date: Jul. 18, 2013

(65) Prior Publication Data
US 2014/0378254 A1 Dec. 25, 2014

(30) Foreign Application Priority Data

Jan. 10, 2012 (JP) .................... 2012-001994
Jan. 10, 2012 (JP) .................... 2012-002004

(51) Int. Cl.
*F16H 7/12* (2006.01)
*F16C 19/22* (2006.01)
(Continued)

(52) U.S. Cl.
CPC ............. *F16H 7/12* (2013.01); *F16C 13/006* (2013.01); *F16C 33/541* (2013.01);
(Continued)

(58) Field of Classification Search
CPC .... F16H 7/12; F16H 2007/185; F16C 19/225; F16C 19/26; F16C 19/446;
(Continued)

(56) References Cited

U.S. PATENT DOCUMENTS 2,894,791 A * 7/1959 White .................. F16C 19/466
29/898.061
3,736,034 A * 5/1973 Molloy .................. F16C 19/26
29/898.065
(Continued)

FOREIGN PATENT DOCUMENTS

DE 195 17 217 5/1996
EP 1 760 340 3/2007
(Continued)

OTHER PUBLICATIONS

Japanese Office Action issued Sep. 29, 2015 in corresponding Japanese Patent Application No. 2012-002004 (with English translation).
(Continued)

*Primary Examiner* — Minh Truong
(74) *Attorney, Agent, or Firm* — Wenderoth, Lind & Ponack, L.L.P.

(57) ABSTRACT

A chain guide is provided which reduces moving resistance of a camshaft-driving, torque-transmitting timing chain. The chain guide includes a guide base provided on one side of the timing chain to face the timing chain and having an opposed pair of side plates. The side plates support respective ends of roller shafts each rotatably supporting a chain-guiding needle roller bearing. Each needle roller bearing includes a retainer guided by needle roller elements.

8 Claims, 6 Drawing Sheets

(51) Int. Cl.
*F16C 19/26* (2006.01)
*F16C 19/46* (2006.01)
*F16C 33/46* (2006.01)
*F16C 33/54* (2006.01)
*F16C 13/00* (2006.01)
*F16C 33/58* (2006.01)
*F16H 7/20* (2006.01)
*F16H 7/08* (2006.01)
*F16C 33/66* (2006.01)

(52) U.S. Cl.
CPC .......... *F16C 33/545* (2013.01); *F16C 33/583* (2013.01); *F16H 7/20* (2013.01); *F16C 19/466* (2013.01); *F16C 33/6659* (2013.01); *F16C 2240/70* (2013.01); *F16C 2361/63* (2013.01); *F16H 7/1281* (2013.01); *F16H 2007/0865* (2013.01); *F16H 2007/0893* (2013.01)

(58) Field of Classification Search
CPC ...... F16C 33/46; F16C 33/541; F16C 33/543; F16C 33/546; F16C 33/583; F16C 19/466
See application file for complete search history.

(56) References Cited

U.S. PATENT DOCUMENTS

| | | |
|---|---|---|
| 5,826,988 A | 10/1998 | Furukawa et al. |
| 6,106,158 A * | 8/2000 | Hayashi ................. F16C 19/30 384/621 |
| 6,203,205 B1 * | 3/2001 | Murai ..................... F16C 19/26 384/450 |
| 8,166,657 B2 * | 5/2012 | Oishi ....................... C21D 1/10 29/898.061 |
| 2007/0047864 A1 | 3/2007 | Terada et al. |
| 2007/0154127 A1 * | 7/2007 | Oishi ....................... C21D 1/10 384/569 |
| 2008/0181549 A1 * | 7/2008 | Nakano ................... F01L 1/047 384/570 |
| 2011/0294612 A1 | 12/2011 | Kato |

FOREIGN PATENT DOCUMENTS

| | | |
|---|---|---|
| EP | 2 395 261 | 12/2011 |
| JP | 50-090042 | 7/1975 |
| JP | 07-103240 | 4/1995 |
| JP | 09-151944 | 6/1997 |
| JP | 09-236130 | 9/1997 |
| JP | 2000 074071 | 3/2000 |
| JP | 2000-240662 | 9/2000 |
| JP | 2004-270838 | 9/2004 |
| JP | 2006-153127 | 6/2006 |
| JP | 2007-078097 | 3/2007 |
| JP | 2009-293603 | 12/2009 |
| JP | 2011-058551 | 3/2011 |
| JP | 2011 089553 | 5/2011 |
| WO | 2010/090139 | 8/2010 |

OTHER PUBLICATIONS

Japanese Office Action issued Sep. 29, 2015 in corresponding Japanese Patent Application No. 2012-001994 (with English translation).
European Office Action issued Mar. 9, 2015 in European Application No. 12865500.8.
International Search Report issued Mar. 19, 2013 in International (PCT) Application No. PCT/JP2012/083834.
Written Opinion of the International Searching Authority issued Mar. 19, 2013 in International (PCT) Application No. PCT/JP2012/083834 (with English translation).

* cited by examiner

CHAIN TENSIONER AND CHAIN TRANSMISSION DEVICE

TECHNICAL FIELD

This invention relates to a chain guide used to adjust the tension of a chain, or to guide the movement of the chain, and a chain transmission device including such a chain guide.

BACKGROUND ART

A chain transmission device including a timing chain trained around a driving sprocket mounted to a crankshaft and a driven sprocket mounted to a camshaft and adapted to drive the camshaft further includes a pivotable chain guide provided on one side of the slack side of the timing chain, and a chain tensioner adapted to apply an adjusting force to the end of the chain guide remote from the end about which the chain guide pivots, thereby minimizing slackening and flapping of the timing chain by tensioning the chain.

Such a chain transmission device further includes a stationary chain guide fixedly mounted to extend along the tension side of the timing chain to guide the movement of the timing chain, thereby further reducing flapping of the chain.

Such known chain guides, which are used to adjust the tension of the timing chain or guide the movement of the timing chain, include those of the type that guides the timing chain by being in surface-to-surface sliding contact with the timing chain. This type of chain guide, however, has a problem in that a large moving resistance is applied to the timing chain, thus increasing loss of torque to be transmitted.

In order to avoid this problem, WO 2010/090139A proposes a chain guide which includes a guide base elongated in a moving direction of the timing chain, a plurality of roller shafts arranged along a curved line and having both ends thereof supported by the guide base, and rollers comprising roller bearings rotatably mounted on the respective roller shafts such that the timing chain is movably guided by the rollers.

In this chain guide, since the timing chain is guided by the rollers with the rollers in rolling contact with the timing chain, moving resistance applied to the timing chain is small, and so is the loss of torque to be transmitted, compared to when the timing chain is guided by surface-to-surface sliding contact.

OBJECT OF THE INVENTION

In the chain guide disclosed in WO 2010/090139A, while roller bearings are used as the rollers, WO 2010/090139A is completely silent about how the retainer of each bearing is guided. If the retainer is guided by the bearing races, large torque is applied to the outer race. Since the torque applied to the outer race becomes moving resistance of the timing chain, the larger the torque applied to the outer race, the larger the torque loss tends to be. The larger the torque, the larger the fuel consumption of the engine is. It is therefore desired to reduce the torque applied to the outer race, thereby reducing fuel consumption.

In the chain guide disclosed in WO 2010/090139A, since the rolling bearings are lubricated only by lubricating oil carried by the timing chain, it is difficult to deliver a sufficiently large amount of lubricating oil to the rolling surfaces of the outer races of the bearings. This could result in peeling of the outer races, which in turn reduces the life of the bearings.

SUMMARY OF THE INVENTION

An object of the present invention is to provide a chain guide which can guide the movement of the timing chain with reduced moving resistance and thus can reduce fuel consumption.

Another object of the invention is to more effectively lubricate the rolling bearings.

MEANS FOR ACHIEVING THE OBJECT

In order to achieve these objects, the present invention provides a chain guide configured to be arranged along a portion of an outer periphery of a timing chain, and comprising a guide base elongated in a moving direction of the timing chain and including side plates, a plurality of roller shafts spaced apart from each other in the length direction of the side plates and each having two ends supported by the respective side plates, and rollers rotatably mounted on the respective roller shafts, and configured to guide the chain, wherein each of the rollers is a roller bearing comprising an outer race formed with flanges inwardly extending from respective axial ends of the outer race, a retainer mounted in the outer race and formed with pockets spaced apart from each other in a circumferential direction of the retainer, roller elements received in the respective pockets and capable of rolling on a roller element rolling surface formed on an inner periphery of the outer race and on a cylindrical outer peripheral surface of a corresponding one of the roller shafts, wherein in each of the roller bearings, the retainer has a radially outer surface kept out of contact with the roller element rolling surface of the outer race, and a radially inner surface kept out of contact with the cylindrical outer peripheral surface, and wherein the roller elements are guided by the retainer.

The present invention also provides a chain transmission device comprising a driving sprocket, a driven sprocket, a timing chain trained around the driving sprocket and the driven sprocket, a pivotable chain guide provided on one side of the slack side of the timing chain so as to guide the movement of the timing chain, and having a first end about which the chain guide is pivotable, and a second end remote from the first end, and a chain tensioner configured to apply an adjusting force to the second end of the chain guide, thereby pressing the second end of the chain guide against the timing chain, wherein the pivotable chain guide is the above-described chain guide according to the present invention.

This chain transmission device may further comprise a stationary chain guide fixedly mounted in position on one side of a tension side of the timing chain so as to guide the movement of the timing chain, wherein the stationary chain guide is the above-described chain guide according to the present invention. With this arrangement, it is possible to more effectively prevent flapping of the timing chain.

In the chain guide according to the present invention, as the rollers for guiding the movement of the timing chain, roller bearings are used in which the retainer is guided by the roller elements and is kept out of contact with both the outer race and the roller shaft. Torque applied to the outer races of such bearings is extremely small, so that the outer races can be smoothly rotated by contact with the timing chain. This minimizes loss of torque transmitted by the movement of the timing chain, and thus reduces fuel consumption.

The retainer of each roller bearing may be formed by pressing or forming a steel plate, and have crossbars defined between respective adjacent pairs of the pockets and each comprising an inner crossbar portion located inwardly of a pitch circle of the roller elements and having two axial ends, inclined crossbar portions integrally connected to respective axial ends of the inner crossbar portion and each having an outer axial end, and outer crossbar portions integrally connected to outer axial ends of the respective inclined crossbar portions and located outwardly of the pitch circle of the roller elements, whereby the retainer has a V-shaped section.

Such a retainer is preferably configured such that each pocket has a circumferentially opposed pair of side surfaces inclined inwardly in opposite directions to each other such that an opening of the pocket on the radially outer surface of the retainer has a circumferential width larger than a diameter of the roller elements, and such that an opening of the pocket on the radially inner surface of the retainer has a circumferential width smaller than the diameter of the roller elements. With this arrangement, since the side surfaces of the inclined crossbar portions of the crossbars contact and are guided by the roller elements at portions of the side surfaces of the inclined crossbar portions that are located at portions thereof located radially inwardly of the pitch circle of the roller elements. This retainer can be more easily guided by the roller elements than retainers of which the opposed side surfaces of each pocket are parallel to each other.

The guide surfaces of the crossbars guided by the roller elements are preferably shear surfaces. This is because shear surfaces are smoother than broken surfaces, so that by guiding the roller elements along such shear surfaces, the roller elements encounter less rotational resistance than when the roller elements are guided along broken surfaces. Torque loss thus decreases.

In the chain guide according to the present invention, preferably, in each of the roller bearings, the flanges of the outer race have an inner diameter larger than the diameter of circular contact portions between the retainer and the roller elements, and smaller than the outer diameter of the retainer at the outer ends thereof. With this arrangement, extremely large gaps are formed between the radially inner surfaces of the flanges and the radially outer surface of the roller shaft, and still, the retainer is prevented from separation.

As a result, lubricating oil carried by the timing chain, transferred onto the radially outer surface of the outer race of each bearing, and flowing down along the outer side surfaces of the flanges from the radially outer surface of the outer race can more easily flow into the bearing through the above gaps, so that the interior of the bearing can be effectively lubricated.

Preferably, in each of the roller bearings, the flanges of the outer race have radially inner surfaces tapered such that the diameters of the radially inner surfaces of the respective flanges increase toward the outer side surfaces of the respective flanges. With this arrangement, lubricating oil flowing along the outer side surfaces of the flanges to the large-diameter ends of the tapered surfaces flows along the tapered surfaces into the bearing, so that it is possible to effectively introduce lubricating oil into the bearing and thus to more effectively lubricate the bearing.

Further preferably, in each of the roller bearings, the outer side surfaces of the flanges of the outer race are convex curved surfaces. With this arrangement, lubricating oil flowing along the outer side surfaces of the flanges can more easily flow toward the radially inner surfaces of the flanges. Lubricating oil can thus be more effectively introduced into the bearing.

ADVANTAGES OF THE INVENTION

According to the present invention, the rollers for guiding a timing chain while rolling on the timing chain comprise rolling bearings each having a retainer guided by the roller elements. Torque of such bearings is small compared to bearings of the type in which the retainers are guided by bearing races such as the outer races, so that the outer races can be smoothly rotated by contact with the timing chain. This reduces loss of torque transmitted by the moving timing chain, and thus reduces fuel consumption.

According to the present invention, in each of the roller bearings, the flanges of the outer race have an inner diameter larger than the diameter of circular contact portions between the retainer and the roller elements, and smaller than the outer diameter of the retainer at the outer ends thereof. With this arrangement, extremely large gaps are formed between the radially inner surfaces of the flanges and the radially outer surface of the roller shaft. The gaps allow lubricating oil carried by the timing chain to be easily introduced into the bearing, thus making it possible to more effectively lubricate the interior of the bearing.

BEST MODE FOR EMBODYING THE INVENTION

Figure 1:
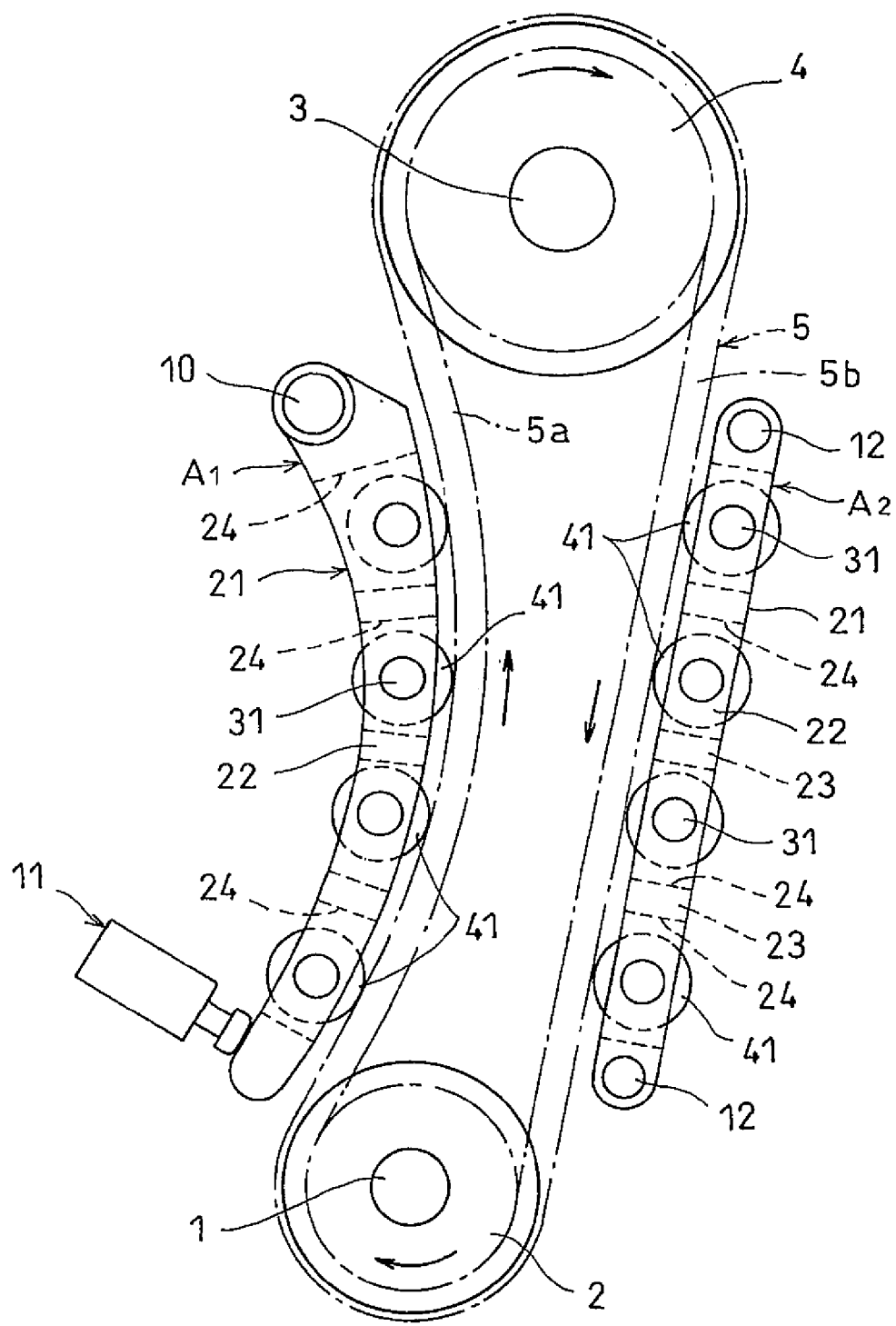
FIG. 1 is a schematic view of a chain transmission device embodying the present invention.

Now the embodiment of this invention is described with reference to the drawings. FIG. 1 shows a chain transmission device for driving a camshaft which includes a timing chain 5 trained around a driving sprocket 2 mounted to an end of a crankshaft 1 and a driven sprocket 4 mounted to an end of a camshaft 3.

The timing chain 5 may be a roller chain or a silent chain.

The crankshaft 1 is rotated in the direction of the arrow in FIG. 1. When the crankshaft 1 is rotated, the timing chain 5 is moved in the direction of the arrows in FIG. 1. A chain guide $A_1$ is provided at the slack side 5a of the timing chain 5.

The chain guide $A_1$ is elongated in the moving direction of the chain and has an upper end thereof supported by a pivot shaft 10 protruding from an engine block so as be pivotable about the pivot shaft 10. A chain tensioner 11 is provided to apply an adjusting force to the end of the chain guide $A_1$ remote from the pivot shaft 10, i.e., the lower end of the chain guide $A_1$, thereby pressing the chain guide $A_1$ against the slack side 5a of the timing chain 5.

A chain guide $A_2$ is provided at the side of the timing chain 5 opposite to the slack side 5a. Similar to the chain guide $A_1$, the chain guide $A_2$ is elongated in the moving direction of the timing chain 5. The chain guide $A_2$ has upper and lower ends thereof fixed in position by threading bolts 12 into the engine block and tightening the bolts 12, and serves to guide the movement of the timing chain 5.

The chain guides $A_1$ and $A_2$ are identical in structure to each other and differ only in shape. Thus, only the structure of the pivotable chain guide $A_1$ is described below, and the description of the fixed chain guide $A_2$ is omitted, with the corresponding elements of the two chain guides indicated by identical numerals.

Figure 2:
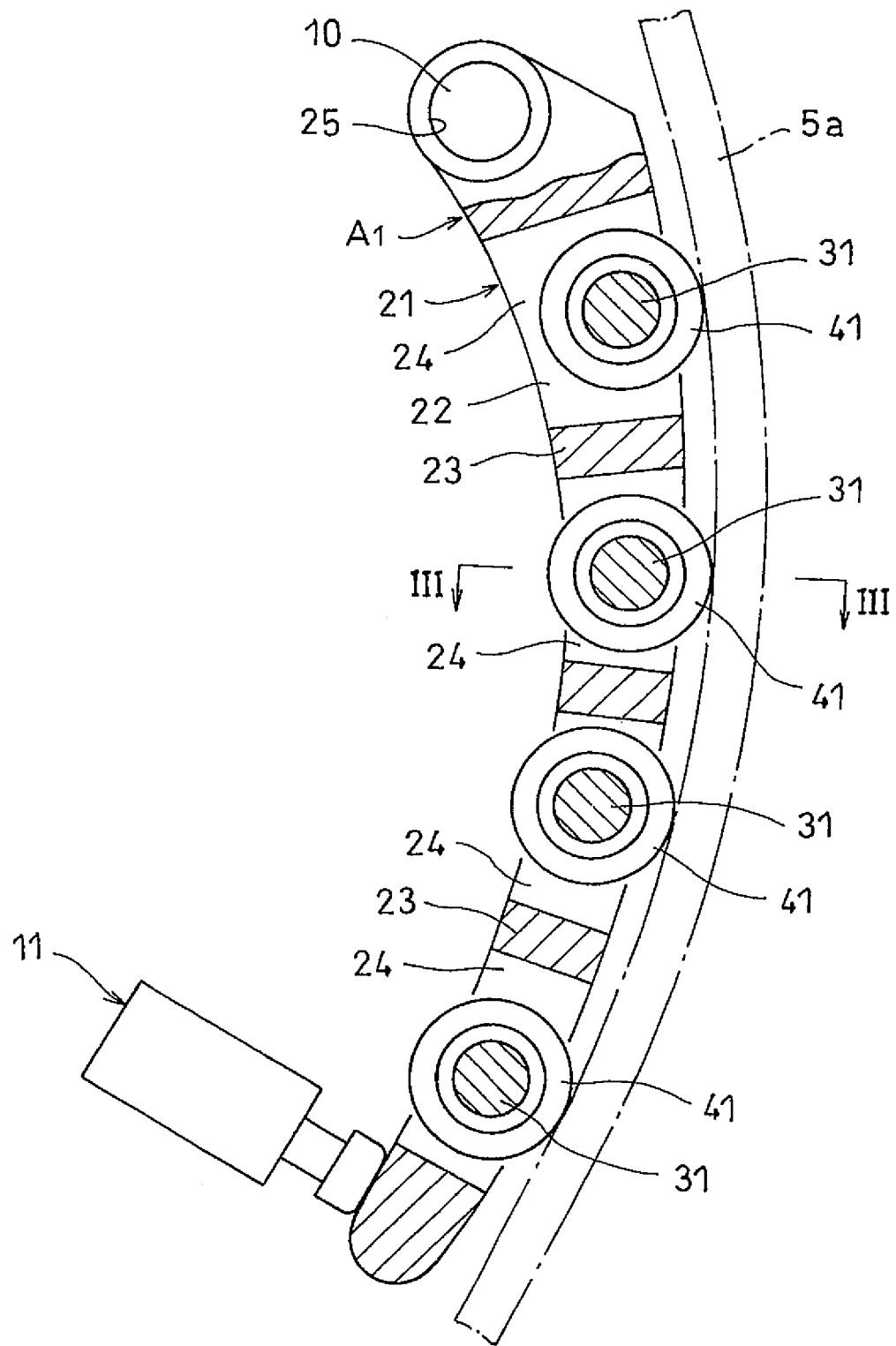
FIG. 2 is a longitudinal sectional view of a chain guide embodying the present invention.
Figure 3:
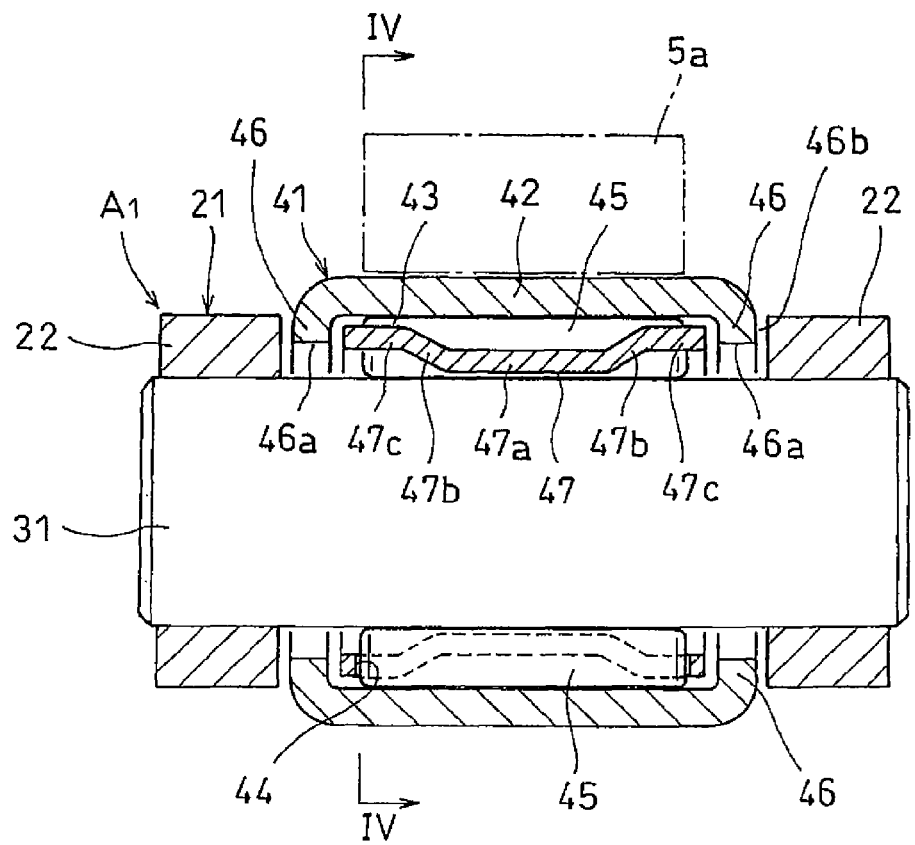
FIG. 3 is a sectional view taken along line III-III of FIG. 2.

As shown in FIGS. 1 to 3, the pivotable chain guide $A_1$ includes a guide base 21 elongated in the moving direction of the timing chain 5. The guide base 21 carries a plurality of roller shafts 31 spaced apart from each other in the length direction of the guide base 21. Rollers 41 are rotatably supported by the respective roller shafts 31 and configured to guide the chain.

The guide base 21 has an opposed pair of side plates 22 between which spacer plates 23 are disposed so as to be spaced apart from each other in the length direction of the chain guide. Roller mounting spaces 24 are defined between the respective adjacent spacer plates 23.

In the embodiment, the side plates 22 of the chain guide $A_1$ are bow-shaped members, while the side plates 22 of the chain guide $A_2$ are straight strip members. However, bow-shaped side plates 22 may be used for the chain guide $A_2$ too.

In the embodiment, the guide base 21 is formed from a synthetic resin. Instead, the guide base 21 may be formed by forging or die-casting a light metal such as an aluminum alloy or a magnesium alloy.

In the embodiment, each of the roller shafts 31 is mounted in one of the roller mounting spaces 24 with both ends thereof supported by the respective side plates 22 such that centers of the roller shafts 31 lie on a convex circular arc. Instead, the roller shafts 31 may be arranged such that centers thereof lie on a curved line other than a circular arc.

The roller shafts 31 are made of SUJ2 steel or SC steel. The roller shafts 31 are subjected to heat treatment to increase hardness and thus wear resistance. In the embodiment, bright hardening is used as heat treatment. Instead, the roller shafts may be subjected to induction hardening, carburizing or carbonitriding.

Figure 4:
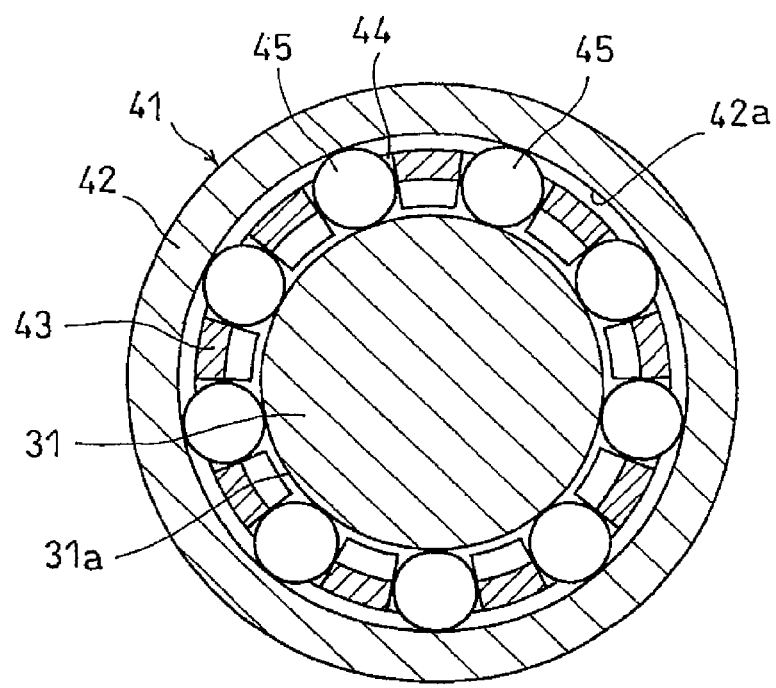
FIG. 4 is a sectional view taken along line IV-IV of FIG. 3.
Figure 5:
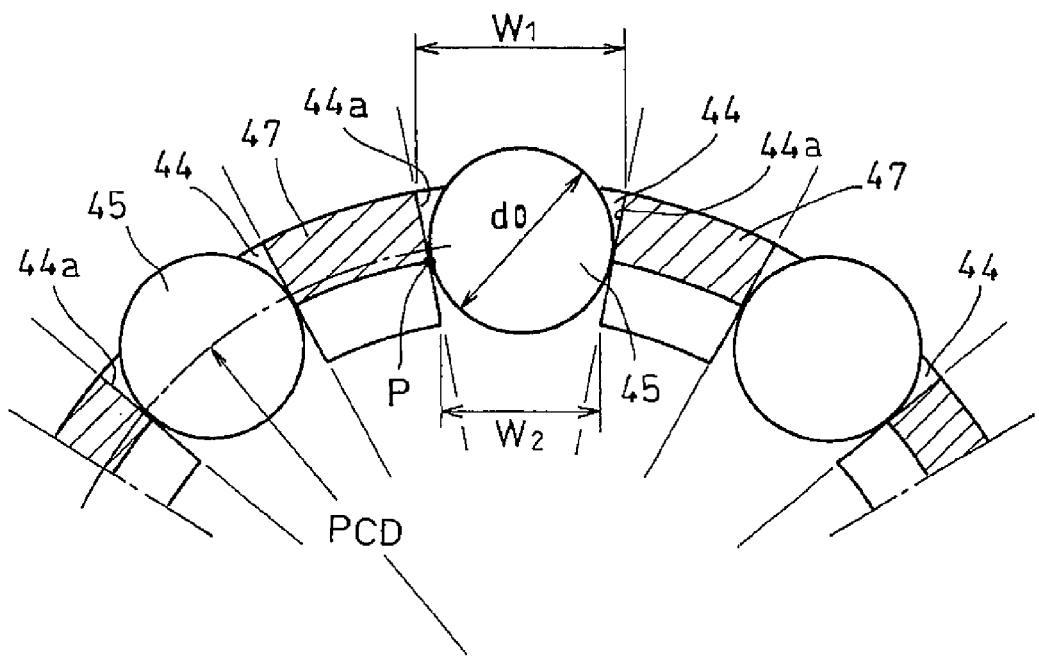
FIG. 5 is a partial enlarged sectional view of FIG. 4.

The rollers 41 are rotatably supported by the respective roller shafts 31. As shown in FIGS. 3 to 5, the rollers 41 are needle roller bearings, each including an outer race 42 in which a retainer 43 is mounted. The retainer 43 is formed with circumferentially spaced apart pockets 44 in each of which a needle roller element 45 is received.

The outer race 42 is made of a low-carbon steel such as SPC steel or SCM steel, and is formed into a shell shape by drawing. The outer race 42 is subjected to heat treatment to increase surface hardness. The outer race 42 has inwardly extending flanges 46 at respective axial ends thereof to prevent separation of the retainer 43.

In the embodiment, carburizing or carbonitriding is used as heat treatment of the outer race 42. Instead, the outer race 42 may be made of high carbon steel such as SUJ2 or SC steel, and the outer race 42 may be subjected to bright hardening or induction hardening.

The retainer 43 is formed by pressing or forming a steel plate. Crossbars 47 are defined between adjacent ones of the circumferentially spaced apart pockets 44 of the retainer 43. Each of the crossbars 47 includes an inner crossbar portion 47a located inwardly of the pitch circle PCD of the needle roller elements 45. Inclined crossbar portions 47b are integrally connected to the respective axial ends of the inner crossbar portion 47a. Outer crossbar portions 47c are integrally connected to the outer axial ends of the respective inclined crossbar portions 47b so as to be located outwardly of the pitch circle of the needle roller elements 45. The crossbars 47 thus have a V-shaped section as a whole.

As shown in FIG. 5, each pocket 44 has a circumferentially opposed pair of side surfaces 44a inwardly inclined in opposite directions to each other such that the opening of the pocket 44 on the radially outer surface of the retainer has a circumferential width $W_1$ which is larger than the diameter do of the needle roller element 45 and such that the opening of the pocket 44 on the radially inner surface of the retainer has a circumferential width $W_2$ which is smaller than the diameter do of the needle roller element 45. The retainer is further configured such that the inclined crossbar portions 47b are each partially kept in contact with and guided by the outer periphery of the corresponding needle roller element 45 at a portion thereof located radially inwardly of the pitch circle PCD of the needle roller elements. The retainer 43 is also arranged such that the radially outer surface thereof is kept out of contact with a rolling surface 42a of the outer race 42 by which the needle roller elements 45 are guided while rolling thereon, and such that the radially inner surface thereof is kept out of contact with the cylindrical radially outer surface 31a of the roller shaft 31.

Figure 6:
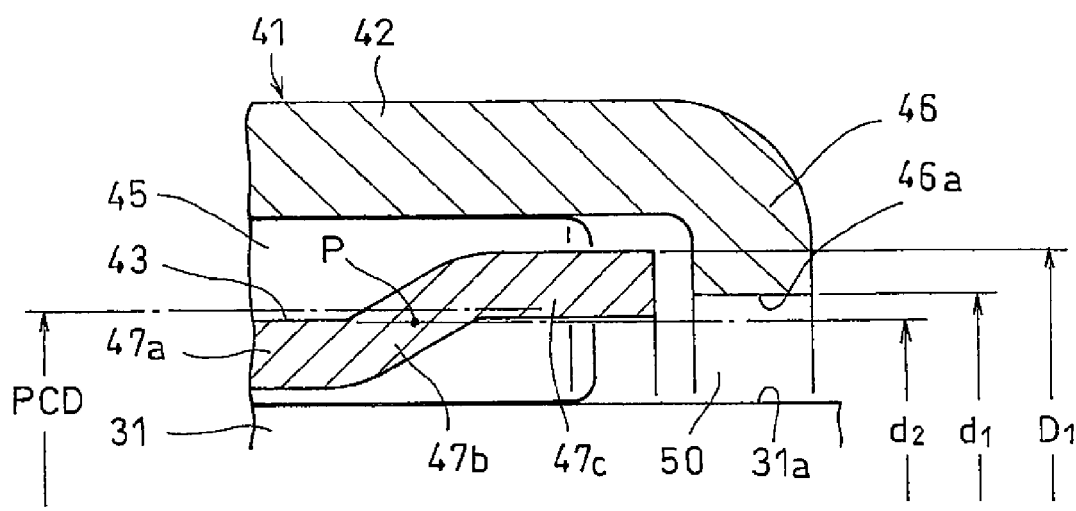
FIG. 6 is a partial enlarged sectional view of FIG. 3.

As shown in FIG. 6, the flanges 46 of the outer race 42 have an inner diameter $d_1$ smaller than the outer diameter $D_1$ of the retainer 43 at the outer ends thereof, and larger than the diameter $d_2$ of the circular contact portions P between the retainer 43 and the needle roller elements 45. A gap 50 is defined between the radially inner surface 46a of each flange 46 and the radially outer surface 31a of the roller shaft 31.

Figure 7:
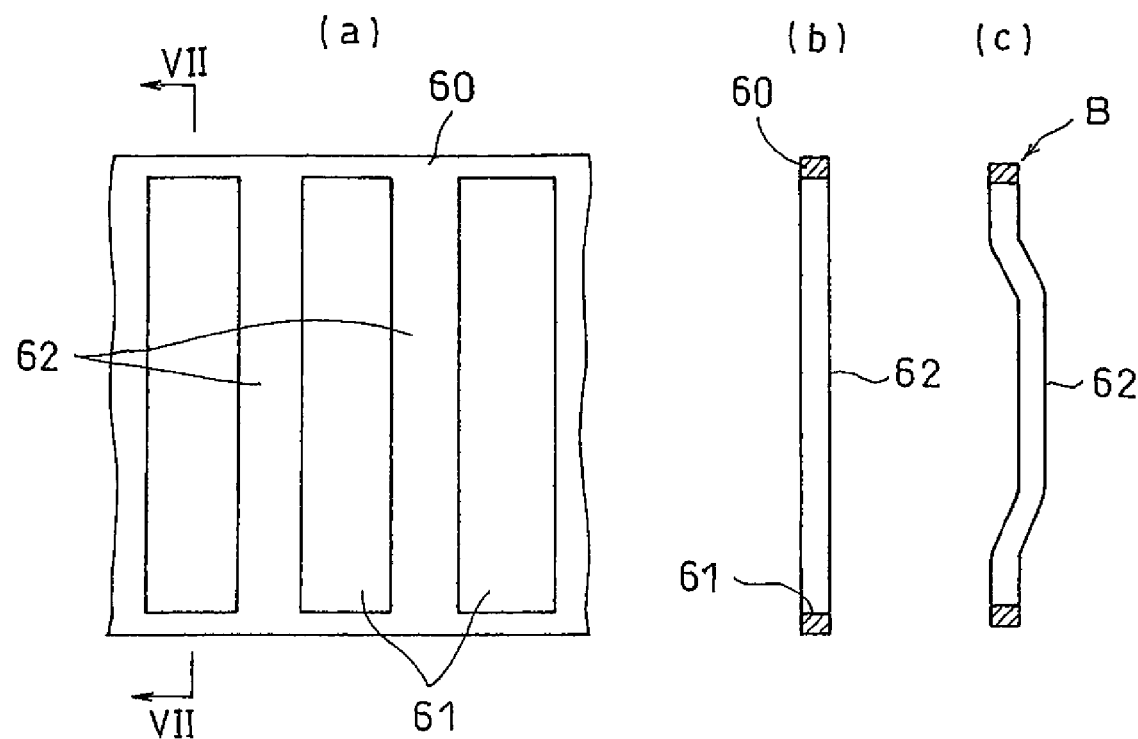
FIG. 7(a) is a plan view of a blank for a retainer shown in FIG. 4.
FIG. 7(b) is a sectional view taken along line VII-VII of FIG. 7(a)
FIG. 7(c) is a sectional view of the blank after crossbars are formed by bending.

An example of such a retainer 43 is shown FIGS. 7(a) and 7(b). This retainer is formed from a strip of steel plate 60 in which rectangular pockets 61 are formed by press-cutting so as to be equidistantly spaced apart from each other in the length direction of the strip of steel plate 60, and then, crossbars 62 defined between the adjacent pockets 61 are bent in the shape of the letter V toward one side of the strip of steel plate 60 as shown in FIG. 7(c), thereby forming a retainer blank B. The retainer blank B is bent into a cylinder with the V-shaped bent portions of the crossbars located radially inwardly, and circumferential ends thereof are welded together. This retainer is thus formed easily.

Since the pockets 61 are formed by press-cutting, the inner surfaces of the pockets 61 are shear surfaces and thus are smooth. Since the smooth shear surfaces are guided by the cylindrical radially outer surfaces of the needle roller elements 45, the retainer 43 offers minimum rotational resistance to the needle roller elements 45, thus minimizing torque loss while the outer race 42 is rotating.

Instead of the needle roller bearings 41, cylindrical roller bearings may be used.

In the chain transmission of the embodiment, while the rotation of the crankshaft 1 is being transmitted to the camshaft 3 through the movement of the timing chain 5, which is trained around the driving sprocket 2 and the driven sprocket 4, the chain tensioner 11 prevents flapping and loosening of the timing chain 5 due to fluctuations in tension of the timing chain 5.

While the rotation (torque) of the crankshaft 1 is being transmitted to the camshaft 3, the timing chain 5, which is moving at high speed, is kept in rolling contact with and guided by the outer races 42 of the needle roller bearings 41 of the pivotable chain guide $A_1$ and the stationary chain guide $A_2$, while the outer races 42 are rotated by the timing chain 5.

In this state, in each needle roller bearing 41, since the retainer 43 is guided by the roller elements while being kept out of contact with the outer race 42, torque of the needle roller bearings 41 is extremely small, so that the outer races 42 are rotated smoothly. Since the outer races 42 are rotated smoothly, the timing chain 5, which is kept in contact with and guided by the outer races 42, is moved smoothly with minimum torque loss. This reduces fuel consumption.

While torque is being transmitted from the crankshaft 1 to the camshaft 3, lubricating oil is delivered onto the radially outer surfaces of the outer races 42 of the needle roller bearings 41 by the timing chain 5, which is moving in one direction. Lubricating oil then flows radially inwardly along the outer side surfaces of the flanges 46 and flows into the bearings 41 through the gaps 50 defined between the radially inner surfaces 46a of the flanges 46 and the radially outer surfaces 31a of the roller shafts 31, thus lubricating the bearings.

If these gaps 50 are too small, a sufficient amount of lubricating oil cannot be supplied into the bearings, which could cause, for example, peeling on the raceways of the outer races 42 or rolling surfaces of the roller elements 45, thus shortening the life of the bearings.

However, in this embodiment, as shown in FIG. 6, since, in each of the needle roller bearings 41, the inner diameter $d_1$ of the flanges 46 of the outer race 42 is determined to be larger than the diameter $d_2$ of the circular contact portions P between the retainer 43 and the needle roller elements 45, and smaller than the outer diameter $D_1$ of the retainer 43 at the outer ends thereof, the gaps 50 between the radially inner surfaces 46a of the flanges 46 and the radially outer surface 31a of the roller shaft 31 are extremely large, and still, the retainer 43 is prevented from separation.

Thus, lubricating oil that flows radially inwardly along the outer side surfaces of the flanges from the radially outer surface of the outer race 42 can more easily flow into the bearing through the gaps 50. The interior of the bearing is thus lubricated effectively by the lubricating oil flowing into the bearing. This prevents shortening of the life of the needle roller bearing 41.

Figure 8:
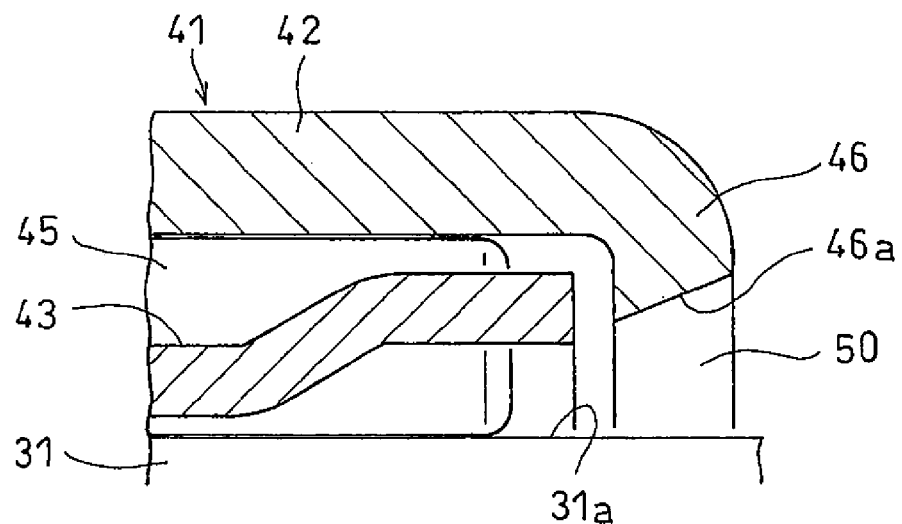
FIG. 8 is a sectional view of a different needle roller bearing.
Figure 9:
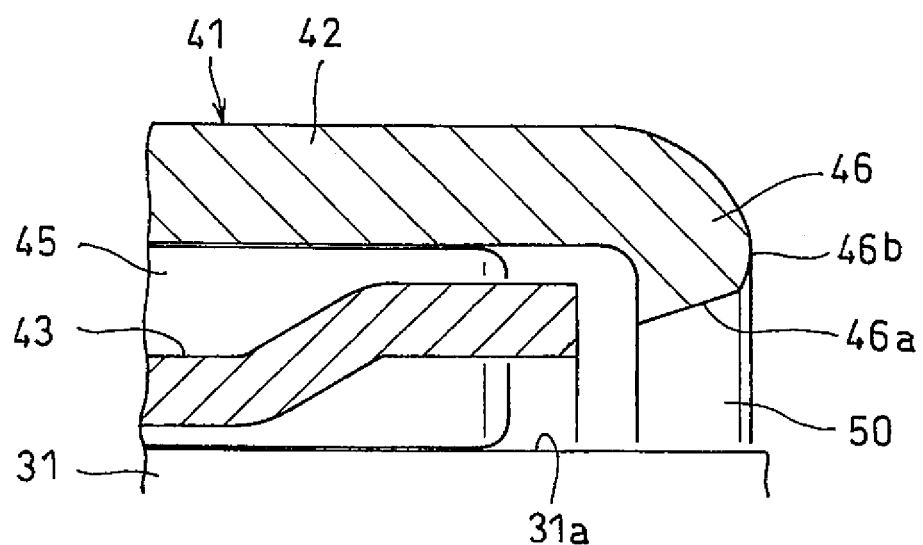
FIG. 9 is a sectional view of another different needle roller bearing.

FIGS. 8 and 9 show different needle roller bearings 41. The needle roller bearing 41 shown in FIG. 8 differs from the needle roller bearing 41 shown in FIG. 6 only in that the radially inner surfaces 46a of the flanges 46 of the outer race 42 are tapered such that diameters thereof increase toward the outer side surfaces of the flanges 46. The small-diameter ends of the tapered radially inner surfaces 46a have a diameter equal to the inner diameter $d_1$ of the flanges 46 shown in FIG. 6.

In FIG. 8, since the flanges 46 of the outer race 42 have tapered radially inner surfaces 46a, lubricating oil flowing along the outer side surfaces of the flanges 46 to the large-diameter ends of the tapered surfaces 46a flows along the tapered surfaces 46a into the bearing. Thus, lubricating oil can be effectively taken into the bearing.

The needle roller bearing 41 shown in FIG. 9 differs from the needle roller bearing 41 shown in FIG. 8 only in that the flanges 46 of the outer race 42 have convex curved outer side surfaces 46b. With this arrangement, lubricating oil flowing along the convex curved outer side surfaces 46b can more easily flow toward the radially inner surfaces of the flanges 46, and thus can be more effectively taken into the bearing.

DESCRIPTION OF THE DRAWINGS $A_1$. Chain guide
$A_2$. Chain guide
2. Driving sprocket
4. Driven sprocket
5. Timing chain (chain)
21. Guide base
22. Side plate
31. Roller shaft
31a. Radially outer surface
41. Needle roller bearing (Roller bearing)
42. Outer race
42a. Roller element rolling surface
43. Retainer
44. Pocket
44a. Side surface
45. Needle roller element (roller element)
46a. Radially inner surface
46b. Outer side surface
47. Crossbar
47a. Inner crossbar portion
47b. Inclined crossbar portion
47c. Outer crossbar portion

What is claimed is:

1. A chain guide configured to be arranged along a portion of an outer periphery of a timing chain, and comprising:
   a guide base elongated in a moving direction of the timing chain and including side plates;
   a plurality of roller shafts spaced apart from each other in a length direction of the side plates and each having two ends supported by the respective side plates; and
   rollers rotatably mounted on the respective roller shafts and configured to guide the timing chain, wherein each of the rollers is a roller bearing comprising:
   an outer race formed with flanges extending radially inwardly from respective axial ends of the outer race;
   a retainer mounted in the outer race and formed with pockets spaced apart from each other in a circumferential direction of the retainer; and
   roller elements received in the respective pockets and capable of rolling on a roller element rolling surface formed on an inner periphery of the outer race and on a cylindrical outer peripheral surface of a corresponding one of the roller shafts,
   wherein in each of the roller bearings, the retainer has a radially outer surface kept out of contact with the roller element rolling surface of the outer race, and a radially inner surface kept out of contact with the cylindrical outer peripheral surface, and wherein the roller elements are guided by the retainer, and
   wherein in each of the roller bearings, the flanges of the outer race have an inner diameter larger than a diameter of circular contact portions between the retainer and the roller elements, and smaller than an outer diameter of the retainer at outer ends of the retainer.

2. The chain guide of claim 1, wherein in each of the roller bearings, the retainer is formed by pressing or forming a steel plate, crossbars are defined between respective adjacent pairs of the pockets, and each of the crossbars comprises an inner crossbar portion located radially inwardly of a pitch circle of the roller elements and having two axial ends, inclined crossbar portions integrally connected to the respective axial ends of the inner crossbar portion and each having an outer axial end, and outer crossbar portions integrally connected to the outer axial ends of the respective inclined crossbar portions and located radially outwardly of the pitch circle of the roller elements, whereby the retainer has a V-shaped section.

3. The chain guide of claim 2, wherein in each of the roller bearings, each of the pockets has a circumferentially opposed pair of side surfaces which are inclined inwardly in opposite directions to each other such that an opening of the pocket on the radially outer surface of the retainer has a width in the circumferential direction of the retainer which is larger than a diameter of the roller elements, and such that an opening of the pocket on the radially inner surface of the retainer has a width in the circumferential direction of the retainer which is smaller than the diameter of the roller elements.

4. The chain guide of claim 2, wherein the crossbars have guide surfaces guided by the roller elements, wherein the guide surfaces are shear surfaces.

5. The chain guide of claim 1, wherein in each of the roller bearings, the flanges of the outer race have radially inner surfaces tapered such that diameters of the radially inner surfaces of the respective flanges increase toward outer side surfaces of the respective flanges.

6. The chain guide of claim 5, wherein in each of the roller bearings, the outer side surfaces of the flanges of the outer race are convex curved surfaces.

7. A chain transmission device comprising a driving sprocket, a driven sprocket, a timing chain trained around the driving sprocket and the driven sprocket, a pivotable chain guide provided on one side of a slack side of the timing chain so as to guide a movement of the timing chain, and having a first end about which the chain guide is pivotable, and a second end remote from the first end, and a chain tensioner configured to apply an adjusting force to the second end of the chain guide, thereby pressing the second end of the chain guide against the timing chain,
wherein the pivotable chain guide is the chain guide of claim 1.

8. A chain transmission device comprising a driving sprocket, a driven sprocket, a timing chain trained around the driving sprocket and the driven sprocket, a pivotable chain guide provided on one side of a slack side of the timing chain so as to guide a movement of the timing chain, and having a first end about which the chain guide is pivotable, and a second end remote from the first end, a chain tensioner configured to apply an adjusting force to the second end of the chain guide, thereby pressing the second end of the chain guide against the timing chain, and a stationary chain guide fixedly mounted in position on one side of a tension side of the timing chain so as to guide the movement of the timing chain,
wherein one of the pivotable chain guide and the stationary chain guide is the chain guide of claim 1.

* * * * *